J. L. PERKINS, C. W. PUTNAM & C. M. MUNSON.
TROLLEY WHEEL.
APPLICATION FILED FEB. 26, 1910.
980,432.
Patented Jan. 3, 1911.
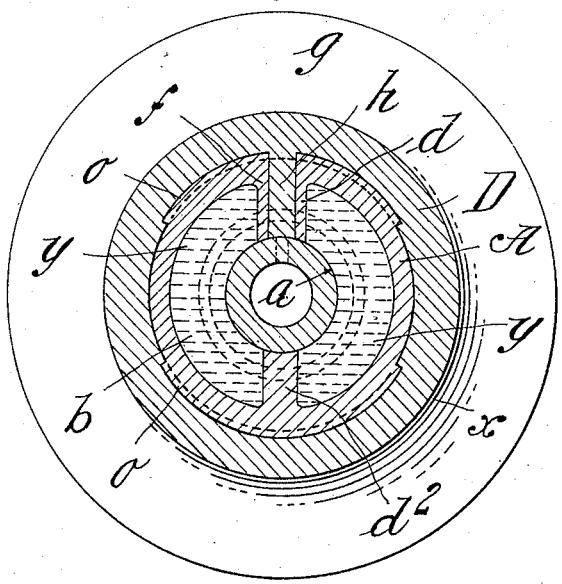
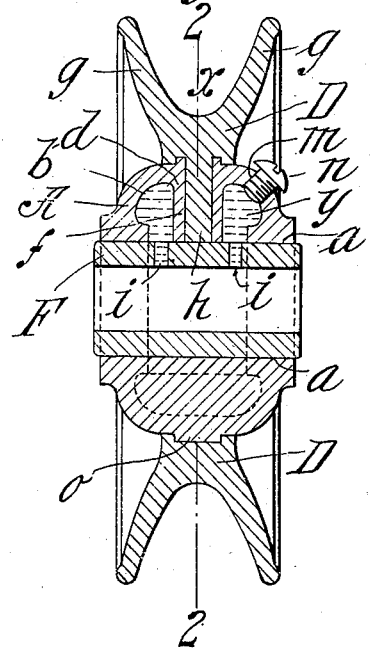
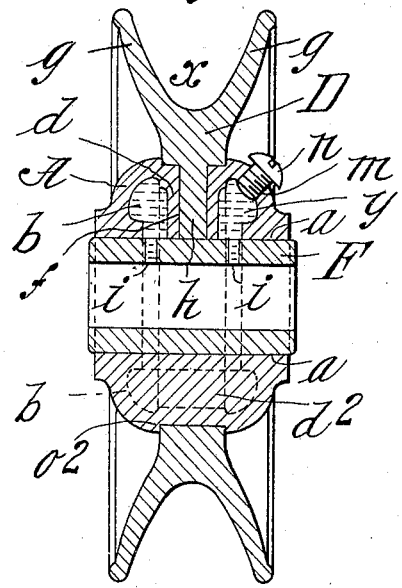
WITNESSES:
H. L. Sprague
R. M. Mowry
INVENTORS,
John L. Perkins,
Clesson W. Putnam,
and Charles M. Munson,
BY
ATTORNEY.

UNITED STATES PATENT OFFICE.

JOHN L. PERKINS, CLESSON W. PUTNAM, AND CHARLES M. MUNSON, OF HOLYOKE, MASSACHUSETTS, ASSIGNORS TO B. F. PERKINS AND SON, INCORPORATED, OF HOLYOKE, MASSACHUSETTS, A CORPORATION OF MASSACHUSETTS.

TROLLEY-WHEEL.

980,432.      Specification of Letters Patent.      Patented Jan. 3, 1911.

Application filed February 26, 1910. Serial No. 546,187.

*To all whom it may concern:*

Be it known that we, JOHN L. PERKINS, CLESSON W. PUTNAM, and CHARLES M. MUNSON, citizens of the United States of America, and residents of Holyoke, in the county of Hampden and State of Massachusetts, have invented certain new and useful Improvements in Trolley-Wheels, of which the following is a full, clear, and exact description.

This invention relates to trolley wheels of a class in which a part of the wheel is composed of an inexpensive metal such as cast iron, while the wire running part is composed of a brazen metal, such as brass, bronze or the like.

The object of the present invention is to improve a wheel of this general description so that there will be an attainment, as nearly as possible, of perfection in the wheel in point of cheapness and practicability of production, the maximum of durability and the highest possible degree of conductivity and efficiency in use in connection with an electric car.

The invention consists in a wheel such as described in conjunction with the accompanying drawings and set forth in the claims.

In the drawings:—Figure 1 is a central sectional view of the trolley wheel taken on the plane of its axis. Fig. 2 is a sectional view centrally through the trolley wheel shown in Fig. 1 but on a plane at right angles to its axis. Fig. 3 is an axial sectional view similar to Fig. 1 but showing a slight and almost manifest modification of construction.

Similar characters of reference indicate corresponding parts in all of the views.

In the drawings,—A represents the body of the trolley wheel having an axial opening $a$ therethrough, having an inclosed annular chamber $b$ therein which surrounds and inwardly communicates with the axial opening; and the said body is provided between its ends with an integrally formed portion $d$ located within the annular chamber, said integrally formed portion extending inwardly from the peripheral outer wall portion and terminating in coincidence with the wall of the opening $a$; and this integrally formed portion $d$ has a passage or aperture $f$ which leads from the periphery of the body through the portion $d$ to the inner end of the latter. The body A with the integral portion $d$ which has the said passage or aperture $f$ therein is understood as made of iron and is preferably produced by casting.

D represents a ring of brass, bronze or other brazen metal, such as commonly employed for good conductivity in trolley wheels having its location entirely outside of the iron body and provided with integral opposite outwardly diverging flanges $g$ $g$ which constitute the borders of the usual annular wire receiving groove $x$. This brazen ring is cast in a surrounding arrangement about, and has a rib and groove engagement with the iron body, so that it is rigidly united, and immovable relatively to the iron body and it has an integral extension $h$ which extends down into and fills the inwardly terminating opening $f$ in the aforementioned integral internal portion $d$ of the iron body.

F, shown in Figs. 1 and 3, represents a brass, bronze, or copper sleeve-like axle receiving bushing having a driving fit in the axial opening of the iron body, made slightly longer than the axial length of the body so that its ends project slightly, in a hub-like manner, beyond the body. This bushing is provided with ducts $i$ $i$ preferably at opposite sides of a median plane of the wheel which is perpendicular to its axis, which ducts extend from the periphery of the bushing to the central axle passage therethrough and by reason of their spaced locations at opposite sides of the middle of the bushing, there is never danger, even if the bushing is driven to its place in the center of the body without care or thought, of the ducts becoming coincident with, and to be stopped up by, the inner end of the integral inwardly extending portion $d$ of the iron body at one side thereof or by the opposite partition-constituting integral extension $d^2$ opposite the integral extension $d$. The integrally formed portion $d^2$ of the body serves as a counterbalance to the portion $d$, and it also constitutes an obstructing wall or baffle for materially lessening the tendency of the lubricant $y$, when not entirely filling the chamber, from remaining and having a whirling movement at the outer wall of the chamber $b$. The lubricant may be introduced into the annular chamber *b* through an opening *m* for which a closing screw plug *n* is provided.

In Fig. 1 the rib and groove engagement is represented as produced by having an annular outstanding rib or flange *o*, or a succession of separated outstanding flanges or lugs as represented in Fig. 2, with which in the casting operation of the brazen ring D the latter acquires an engagement and anchorage, while in Fig. 3 the body is shown as made with a shallow groove or rabbet $o^2$, either peripherally continuous or made in the form of a plurality of separate shallow pockets, into which the base or inner portion of the brazen ring D has its interlocking and anchoring engagement. The brazen ring D, the integrally cast radially arranged and inwardly projecting continuation *h* of which has contact with the middle of the brass or bronze bushing F constitutes a medium of the best conductivity for carrying the current taken from the trolley wire at the rim of the wheel to the bushing and thence to the brass contact springs provided as usual in the trolley harp and having bearings on the hub ends of the wheel. This wheel may be produced in a rapid manner by casting operation entirely practicable as known to metal founders and by the employment of a chill for acquiring a perfectly smooth and hard surface in the wall of the groove of the flanged ring D; and only so much of the higher priced brazen metal is necessarily used as a component in the wheel as to give an adequate life in the wearing portion of the wheel and provide for the perfect conducting of the current in the manner explained; and even when the wheel is completely worn out, the discarded wheel may be broken up and the portions thereof of different metal remelted and reclaimed.

We claim:—

1. A trolley wheel composed of an iron body having an axial opening therethrough, having an annular chamber, surrounding, and inwardly communicating with said axial opening, and provided with an integrally formed portion within its annular chamber which extends inwardly and terminates in coincidence with the wall of the axial opening, which integrally formed portion has a passage leading from the periphery of the body to its inner end, and the said body having also an internal integral, partition forming, and balancing, projection, and a grooved rim portion for the wheel of brazen metal cast in a surrounding engagement about, and having a rib and groove engagement with, the iron body, said grooved brazen rim portion having an integral extension filling the said inwardly terminating opening.

2. A trolley wheel composed of an iron body having an axial opening therethrough, having an inclosed annular chamber surrounding and inwardly communicating with said axial opening, and said body being provided between its ends with an integrally formed portion within its annular chamber which extends inwardly and terminates in coincidence with the wall of the axial opening, such integrally formed portion having a passage leading from the periphery of the body to its inner end, a grooved rim portion for the wheel of brazen metal cast in a surrounding engagement about, and having a rib and groove engagement with, the iron body, said grooved brazen rim portion having an integral inward extension filling the said inwardly terminating opening, and a brazen axle receiving sleeve-like bushing, having a driving fit in the axial opening of the body, and provided with ducts at opposite sides of the median plane of the wheel extending from its periphery to the central passage therein.

Signed by us at Holyoke Mass. in presence of two subscribing witnesses.

JOHN L. PERKINS.
  CLESSON W. PUTNAM.
  CHARLES M. MUNSON.

Witnesses:
 FRED P. CLEVELAND,
 WM. H. BOND.